United States Patent Office 3,425,957
Patented Feb. 4, 1969

3,425,957
**METHOD OF MANUFACTURING HYDRO-
CRACKING CATALYSTS**
George N. Pessimisis, Berwyn, Ill., assignor to Nalco
Chemical Company, Chicago, Ill., a corporation of
Delaware
No Drawing. Filed July 5, 1966, Ser. No. 562,500
U.S. Cl. 252—455                               8 Claims
Int. Cl. B01j 11/46

ABSTRACT OF THE DISCLOSURE

An improved method for impregnating a porous catalyst support with cobalt oxide and molybdenum trioxide by reacting a slurry of the catalyst support with a slurry containing molybdenum trioxide and cobalt carbonate, filtering the slurry and subsequently reacting the filter cake with an aqueous solution of cobalt and molybdenum salts.

---

This invention relates to the manufacture of catalysts for the conversion of hydrocarbons. More particularly, this invention relates to a method for manufacturing improved hydrocracking catalysts.

The hydrocracking reaction is one wherein mixtures of hydrocarbons are converted to lower boiling products in the presence of added hydrogen and a catalyst at elevated temperature and pressure. A preferred method of hydrocracking employs catalysts comprising various supports having a hydrogenating component disposed thereon. Preferred hydrogenating components known to the art for this purpose are cobalt oxides and molybdenum oxides.

Prior art methods for impregnating various catalyst supports with oxides of cobalt and molybdenum have fallen roughly into one of two classes. One method has been known as the pore volume method and utilizes soluble salts of cobalt and molybdenum, such as cobalt acetate and ammonium molybdate in an aqueous solution. In this method, the catalyst support to be treated is saturated with the aqueous solution and dried, whereupon the soluble salts are deposited within the pore structure of the support. Upon calcining the thus impregnated supports containing the soluble salts of cobalt and molybdenum, the salts are converted to the oxide form.

In another method for impregnating catalyst supports with cobalt and molybdenum oxides, commonly known as the hydrothermal method, a slurry is made of the support to be impregnated. This slurry is heated to a temperature within the range of 150° to 200° F. Aqueous slurries are then made of cobalt carbonate and molybdenum trioxide and added consecutively to the master slurry containing the support to be impregnated. The combined slurry thus formed is reacted between 150° and 200° F. for a period sufficient for the penetration of the cobalt and molybdenum oxides into the catalyst support. This normally involves a period of time of from 1 to 5 hours. This method is described by Keith et al., U.S. 2,938,002.

In efforts to prepare improved hydrocracking catalysts by impregnating various porous supports, the pore volume method proves satisfactory to the extent that a suitable amount of cobalt and molybdenum oxides can be disposed upon the catalyst support by this method. However, the hydrothermal method has the advantage of utilizing cheaper and more available insoluble oxides and carbonates, instead of the more expensive and less available soluble salts of cobalt and molybdenum. The two methods also result in slightly different end product with each having certain advantages as to use.

In efforts to impregnate molecular sieve cracking catalysts by the hydrothermal method, it was found that there was a maximum amount of these oxides which could be deposited on this type of support by the hydrothermal method. This maximum impregnation level was such that it was impossible with prior art methods to make a catalyst containing a high enough level of cobalt oxide and molybdenum trioxide to give the desired activity in hydrocracking.

The above-described problems are particularly arduous ones which prior art methods of impregnation have not been able to cope with to any substantial degree. It would therefore be of benefit to the art if a method were discovered whereby the advantages of the hydrothermal method of impregnation of catalyst supports could be realized, while obtaining the desired level of impregnation of a porous catalyst support that would give the desired or optimum level of activity for hydrocracking. For example, if a method could be devised for impregnating a molecular sieve catalyst to a level which would be equal to or greater than the level of impregnation obtainable by the pore volume method, while still obtaining the advantages inherent in the hydrothermal method, it would be of great benefit to the art.

It therefore becomes an object of the invention to provide a method of manufacturing a hydrocracking catalyst whereby a porous catalyst support can be impregnated to a high level with both soluble and insoluble sources of cobalt and molybdenum oxides.

A specific object of the invention is to impregnate a porous catalyst support, and more particularly a molecular sieve catalyst with a high percentage of the impregnating material being disposed in an insoluble oxide form.

Yet another object of this invention is to improve the method for impregnating a porous catalyst support, and more particularly a molecular sieve catalyst support which utilizes the hydrothermal method with certain additional steps which make it possible to distribute a higher quantity of cobalt oxide and molybdenum trioxide upon the molecular sieve support.

Other objects will appear hereinafter.

In accordance with the invention, a novel method of manufacturing a hydrocracking catalyst has been discovered whereby a porous catalyst support is impregnated with both soluble and insoluble compounds of cobalt and molybdenum. In its broadest aspects, the invention comprises the steps of impregnating a porous catalyst support by consecutively subjecting the catalyst to impregnation with insoluble and soluble sources of the desired metal oxides. In order to obtain the most efficient hydrocracking catalyst by means of this invention, it is necessary to follow certain steps which are old to the art in combination with new steps which form the improved total process.

The first step in the method of this invention involves the making up of an aqueous master slurry of porous catalyst support materials. The most desired catalyst support materials for this purpose are those comprised of molecular sieves in an inorganic matrix; however, other porous materials, such as activated alumina, amorphous zeolites, silica gels, various clays and other materials can be used. The inorganic matrix may be an alumino-silicate, silica or alumina or a combination of these materials or compounds containing these materials in conjunction with other inorganic materials. The molecular sieves referred to are both natural and synthetic crystalline metal aluminosilicates. The crystalline structure of these materials is such that a relatively large absorption area is present inside each crystal. Access to this area may be had by way of openings or pores in the crystal. Molecules are selectively absorbed by molecular sieves on the basis of their size and polarity among other characteristics.

Zeolitic molecular sieves consist basically of three-dimensional frameworks of $SiO_4$ and $AlO_4$ tetrahedra.

The tetrahedra are crosslinked by the sharing of oxygen atoms. The electro-valence of the tetrahedra containing aluminum is balanced by the inclusion in the crystal of a cation, for example, metal ions, ammonium ions, amine complexes or hydrogen ions. These materials are normally made by the activation of zeolites by driving off substantially all of the water of hydration.

Molecular sieves useful for this invention are faujasite and synthetic zeolites X, Y and L, among others. The most preferred sieve for use in this invention is the crystalline zeolite Y. Breck, U.S. 3,130,007 describes the production of zeolite Y by reacting various alumina and silica forms to yield a zeolite which is later converted to a molecular sieve.

The aqueous slurry containing the molecular sieve catalyst is mixed thoroughly and heated to a temperature between 80° F. and 212° F., and more preferably from 100° F. to 200° F. Best results are obtained when the slurry is heated and so maintained at a temperature of 150° to 200° F.

Another aqueous slurry is then prepared. This contains an amount of molybdenum trioxide intended to be deposited upon the catalyst support in the impregnation process. This slurry is then added to the catalyst slurry referred to above. The temperature of the resulting combined slurry is maintained within the just-recited temperature range and reaction is allowed to take place for a period of time ranging from 5 to 60 minutes, and more preferably from 10 to 30 minutes.

A third slurry is then made up containing the amount of cobalt oxide, in the form of cobalt carbonate, which is to be deposited upon the porous catalyst support. This slurry is then added to the combined slurry referred to above. The resultant combined slurry which contains the porous catalyst support, the molybdenum trioxide and cobalt carbonate, is reacted at the temperature of the base slurry referred to above for a period of time of from 30 minutes to 3 hours, and more preferably from 60 minutes to 2 hours. The best results are achieved if the combined slurry is reacted for a period of time of from 70 to 110 minutes. Although best results are obtained by adding the molybdenum trioxide and cobalt carbonate to the first slurry in slurry forms, these additions can also be made by adding the dry oxides directly to the first slurry.

The combined slurry is then filtered through a suitable filtering media with the filtrate being preserved. The filter cake is subjected to a drying atmosphere at a temperature of between 212° F. and 600° F., and more preferably, between 220° F. and 350° F. Best results are achieved at a temperature of approximately 250° F. The filter cake is dried for a period of time of from 30 minutes to 3½ hours or, more specifically, until it reaches a free moisture content of between 4 and 25% by weight, and more preferably between 6 and 10% by weight.

After the drying step, it is found upon analysis of the filter cake that the level of impregnation of molybdenum trioxide amounts to only about ½ of that level necessary to achieve a highly active hydrocracking catalyst when the support material is comprised of molecular sieves in an inorganic step. It is therefore necessary to further treat the filter cake, which treatment comprises the subject invention.

The dried material referred to above is mixed with an aqueous solution containing soluble salts of molybdenum and cobalt. In the most preferred aspect of the invention, the filtrate obtained from the filtering of the combined slurry noted above is used in place of the solution in the second impregnation step. However, it is not intended to limit the invention to use of the filtrate for it is conceived that it would be equally as effective to add a newly-prepared aqueous solution of soluble cobalt and molybdenum salts. Upon addition of the aqueous solution containing cobalt and molybdenum to the dried material, the material is mixed or mulled by means of an apparatus such as a Muller mixer for a period of time sufficient to insure a homogeneous mixture.

The homogeneous mixture obtained above is dried for a period of time of from 1 to 6 hours, and more preferably from 3 to 5 hours at a temperature of from 212° F. to 450° F., and most preferably from 200° F. to 300° F. The time and temperature utilized in drying is not as important as the free moisture content of the dried material. This moisture content must be controlled so as to give the proper consistency for tableting or extrusion of the material.

In the most preferred embodiment of this invention, the material is tableted with an organic lubricant to form the finished hydrocracking catalyst. For this purpose, moisture upon redrying should be between 5 and 35% by weight, and more preferably between 15 and 30% by weight. The optimum moisture for tableting is found to be between 22 and 30% by weight. Resulting tablets are calcined at a temperature of between 800° F. and 1200° F. and more preferably between 900° F. and 1100° F. for a period of time of between 4 and 6 hours. Hydrocracking catalysts obtained by the technique of this invention typically show an increase in activity which results in an increase in efficiency of hydrocracking.

The following example shows a typical way of carrying out the aims of the invention. It is understood, of course, that this example is merely illustrative and that the invention is not limited thereto.

Example I 40 pounds of an alumino-silicate cracking catalyst containing Y type molecular sieves and having a moisture content of 7.7% (37.0 pounds of catalyst on dry basis), was impregnated by the method of the invention with enough cobalt carbonate and molybdenum trioxide to result in a finished impregnated catalyst containing theoretically 2.5% cobalt oxide and 5.0% molybdenum trioxide by the steps as outlined below.

Specifically, 40 pounds of a molecular sieve material was slurried in 15 gallons of Chicago tap water and the slurry was heated to 180° F. 908 grams of molybdenum trioxide was slurried in 1 gallon of tap water and added to the catalyst slurry. The combination of these two slurries were allowed to react for 20 minutes at the above temperature.

845 grams of cobalt carbonate was slurried in 1 gallon of water and added to the combined slurry contining sieve catalyst and molybdenum trioxide. The resultant slurry containing catalyst, molybdenum trioxide and cobalt carbonate was allowed to react for 80 minutes at 180–190° F. Upon completion of this reaction time, the resultant slurry was filtered using Buckner funnels. 5 gallons of filtrate were collected from the filtering process and upon analysis were found to contain approximately 3.0 grams per liter of $Al_2O_3$, 17.6 grams per liter of $MoO_3$ and 1.32 grams per liter of $CoO$.

The filter cake obtained in the above filtration process was dried for 5 hours at 300° F. to a free moisture content of 8% by weight. This dried filter cake was then placed in a Muller mixer and mixed intimately with the 5 gallons of filtrate referred to above. The resulting impregnated material was placed in an oven and dried for 5 hours at 300° F. to a free moisture content of 28%. 2% by weight of an organic lubricant, known commercially as "Sterotex," was added to this material and the material was tableted into ⅛ inch tablets. The tablets were then calcined in a furnace at 1000° F. for 6 hours.

The calcined catalyst was tested in a hydrocracking operation and found to show an increased activity which resulted in an efficiency 5 to 10% greater than had been achieved to date with other hydrocracking catalysts. The chemical analysis and physical properties of the molecular sieve containing catalysts base material and the impregnated hydrocracking catalyst resultant material are shown in Table I below.

TABLE I

| Composition, Components | Cracking Catalyst Base Material | Impregnated Catalyst |
|---|---|---|
| Loss on ignition at 1,800° F | 10.2 | *10.8 |
| Al₂O₃ | 13.8 | 12.6 |
| Na₂O | 0.063 | 0.082 |
| SO₄ | 0.30 | 0.29 |
| Fe | 0.044 | 0.045 |
| CoO | | 2.85 |
| MoO₃ | | 4.92 |

| Physical Properties | Cracking Catalyst Base Material | Impregnated Catalyst Untabled | Impregnated Catalyst Tabled |
|---|---|---|---|
| Surface Area (m.²/g.) | 535 | 440 | 395 |
| Pore Volume (ml./g. of CCl₄) | 0.74 | 0.66 | 0.53 |
| Pore Volume (H₂O) | 0.81 | | |
| ABD (g./ml.) | 0.40 | 0.46 | 0.70 |
| Crushing Strength (lbs.) | | | 15.0 |

*Loss on ignition at 1,200° F.

Other advantages are to be noted. For example, since the hydrothermal method which makes up the first half of the method of the subject invention involves only insoluble forms of cobalt and molybdenum, which are completely inorganic, it is only necessary to drive off the water involved in the slurry in order to complete the deposition of the oxides upon the porous catalyst support. In the second part of the treatment of the subject invention, the soluble salts are of the inorganic variety when the filtrate is used for the source of the soluble salts. Here again, it is only necessary to drive off water to complete the deposition of the cobalt oxide and molybdenum trioxide upon the catalyst support. Since it is only necessary to drive off water in both parts of the procedure in the subject invention, it is not necessary to add the additional heat necessary to break down a compound such as ammonium molybdate or cobalt acetate, nor is it necessary to deal with the objectionable vapors which result upon the breaking down of these compounds and which tend to make processing of the catalyst with these compounds hazardous.

Many other advantages of this method of manufacturing hydrocracking catalyst are apparent.

The invention is hereby claimed as follows:

1. In a method for impregnating a porous catalyst support with cobalt oxide and molybdenum trioxide which comprises the steps of making a combined slurry containing water, said porous catalyst support and said molybdenum trioxide and cobalt carbonate, allowing said combined slurry to react at a temperature of at least 100° F., filtering said combined slurry and drying the resulting filter cake to form a dried filter cake having a desired moisture level for ready pelletizing or extrusion; the improvement which comprises the additional steps of adding an aqueous solution of cobalt and molybdenum salts to said dried filter cake to form a mixture of said aqueous solution and filter cake and again drying said mxiture to a moisture level allowing ready pelletizing or extrusion.

2. The method of claim 1 in which said porous catalyst support contains molecular sieves.

3. The method of claim 1 in which said porous catalyst support contains Type Y molecular sieves.

4. The method of claim 1 wherein said mixture is dried to a moisture level greater than 5% and less than 30% moisture.

5. In a method for impregnating a porous catalyst support with cobalt oxide and molybdenum trioxide which comprises the steps of making a combined slurry containing water, said porous catalyst support and said molybdenum trioxide and cobalt carbonate, allowing said combined slurry to react at a temperature of at least 100° F., filtering said combined slurry and drying the resulting filter cake to form a dried filter cake having a desired moisture level for ready pelletizing or extrustion; the improvement which comprises the additional steps of collecting the resulting filtrate from said filtering step, adding said filtrate to said dried filter cake to form a mixture of filtrate and filter cake and again drying said mixture to a moisture level allowing ready pelletizing or extrusion.

6. The method of claim 5 in which said porous catalyst support contains molecular sieves.

7. The method of claim 5 in which said porous catalyst support contains Type Y molecular sieves.

8. The method of claim 5 wherein said mixture is dried to a moisture level greater than 5% and less than 30% moisture.

References Cited

UNITED STATES PATENTS

| | | | |
|---|---|---|---|
| 2,989,305 | 8/1959 | Teter et al. | 252—458 X |
| 2,938,002 | 5/1960 | Keith et al. | 252—464 |
| 3,045,054 | 7/1962 | Holm et al. | 252—459 X |
| 3,147,208 | 9/1964 | Johnson | 252—458 X |
| 3,325,465 | 6/1967 | Jones et al. | 252—459 X |

DANIEL E. WYMAN, *Primary Examiner.*

CARL F. DEES, *Assistant Examiner.*

U.S. Cl. X.R.

252—458, 459, 465

UNITED STATES PATENT OFFICE
CERTIFICATE OF CORRECTION

Patent No. 3,425,957                                          February 4, 1969

George N. Pessimisis

It is certified that error appears in the above identified patent and that said Letters Patent are hereby corrected as shown below:

Column 6, line 40, "2,989,305" should read -- 2,898,305 --.

Signed and sealed this 21st day of April 1970.

(SEAL)
Attest:

Edward M. Fletcher, Jr.                       WILLIAM E. SCHUYLER, JR.
Attesting Officer                                        Commissioner of Patents